(12) United States Patent
Lesser

(10) Patent No.: US 9,077,779 B2
(45) Date of Patent: Jul. 7, 2015

(54) CLIENT DEVICE, METHOD AND COMPUTER PROGRAM FOR PLAYING MEDIA CONTENT

(71) Applicant: Cinemo GmbH, Karlsruhe (DE)

(72) Inventor: Richard Lesser, Karlsruhe (DE)

(73) Assignee: CINEMO GMBH, Karlsruhe (DE)

( * ) Notice: Subject to any disclaimer, the term of this patent is extended or adjusted under 35 U.S.C. 154(b) by 224 days.

(21) Appl. No.: 13/662,016

(22) Filed: Oct. 26, 2012

(65) Prior Publication Data

US 2013/0117354 A1 May 9, 2013

Related U.S. Application Data

(60) Provisional application No. 61/552,949, filed on Oct. 28, 2011.

(30) Foreign Application Priority Data

Oct. 25, 2012 (EP) .................................. 12190037

(51) Int. Cl.
*G06F 15/16* (2006.01)
*H04L 29/06* (2006.01)
*H04L 29/08* (2006.01)
*H04N 21/218* (2011.01)
*H04N 21/442* (2011.01)

(52) U.S. Cl.
CPC ............... *H04L 67/42* (2013.01); *H04L 67/36* (2013.01); *H04L 65/1083* (2013.01); *H04L 65/80* (2013.01); *H04N 21/2181* (2013.01); *H04N 21/44209* (2013.01); *H04N 21/44222* (2013.01)

(58) Field of Classification Search
USPC ......... 709/200, 201, 202, 203, 204, 217, 227, 709/228
See application file for complete search history.

(56) References Cited

U.S. PATENT DOCUMENTS

| | | | | |
|---|---|---|---|---|
| 862,830 | A * | 8/1907 | Lewis | 112/177 |
| 6,064,380 | A * | 5/2000 | Swenson et al. | 715/273 |
| 6,941,378 | B2 * | 9/2005 | Apostolopoulos et al. | 709/231 |
| 7,051,275 | B2 * | 5/2006 | Gupta et al. | 715/201 |
| 7,327,761 | B2 * | 2/2008 | Rajwan et al. | 370/474 |
| 7,609,819 | B1 * | 10/2009 | Tuttle | 379/40 |
| 7,644,175 | B2 * | 1/2010 | Klemets | 709/231 |
| 7,721,339 | B2 * | 5/2010 | Madison et al. | 726/27 |
| 7,801,054 | B2 * | 9/2010 | Reichman et al. | 370/252 |
| 7,805,338 | B2 * | 9/2010 | Kolls | 705/26.1 |
| 7,895,311 | B1 * | 2/2011 | Juenger | 709/223 |

(Continued)

FOREIGN PATENT DOCUMENTS

| | | |
|---|---|---|
| EP | 1796389 | 6/2007 |
| WO | WO-03/107597 | 12/2003 |
| WO | WO-2012/048928 | 4/2012 |

*Primary Examiner* — Sargon Nano
(74) *Attorney, Agent, or Firm* — Michael A. Glenn; Perkins Coie LLP

(57) ABSTRACT

Client device for playing media content, comprising: a connection interface for establishing a connection with a server and for receiving a media content from the server via the connection; a detector for detecting, whether the media content is to be continued beyond a termination of the connection with the server, and for providing a detection result in case it is determined that the media content is to be continued beyond a determination of the connection with the server; and a processor for taking an action to continue the media content beyond a termination of the connection with the server.

14 Claims, 10 Drawing Sheets

(56) References Cited

U.S. PATENT DOCUMENTS

| | | | |
|---|---|---|---|
| 8,402,502 B2* | 3/2013 | Meuninck et al. | 725/133 |
| 8,422,397 B2* | 4/2013 | Ansari et al. | 370/254 |
| 8,630,899 B1* | 1/2014 | Barbulescu et al. | 705/14.55 |
| 8,719,330 B2* | 5/2014 | Gregson | 709/201 |
| 8,719,886 B2* | 5/2014 | Maloney | 725/105 |
| 2002/0143972 A1* | 10/2002 | Christopoulos et al. | 709/231 |
| 2004/0168052 A1* | 8/2004 | Clisham et al. | 713/153 |
| 2004/0267965 A1* | 12/2004 | Vasudevan et al. | 709/250 |
| 2005/0169467 A1* | 8/2005 | Risan et al. | 380/201 |
| 2006/0282319 A1* | 12/2006 | Maggio | 705/14 |
| 2007/0038516 A1* | 2/2007 | Apple et al. | 705/14 |
| 2007/0089145 A1* | 4/2007 | Medford et al. | 725/81 |
| 2007/0094691 A1* | 4/2007 | Gazdzinski | 725/62 |
| 2007/0206773 A1* | 9/2007 | Branam | 379/265.09 |
| 2007/0208789 A1* | 9/2007 | Reichman | 707/205 |
| 2008/0040500 A1* | 2/2008 | Cohen | 709/231 |
| 2009/0030978 A1* | 1/2009 | Johnson et al. | 709/203 |
| 2009/0031311 A1* | 1/2009 | Chang et al. | 718/101 |
| 2011/0107374 A1* | 5/2011 | Roberts et al. | 725/46 |
| 2011/0196973 A1 | 8/2011 | Shaheen et al. | |
| 2012/0185574 A1* | 7/2012 | Cho et al. | 709/219 |
| 2013/0227284 A1* | 8/2013 | Pfeffer et al. | 713/168 |

\* cited by examiner

Action to continue the content is

— download the content from the server, i.e. from the time of a continue playing indication until the end of the content;

— download the remaining content and a variable number of additional items (e. g. 1 or more items of a predefined sequence of items);

— download the remaining playlist;

— start a connection to an Internet stream (e. g. YouTube) by the client device from the position in the stream, where the continue playing indication was received;

— search the content in the client's own database for playback and to resume playback at the position when the continue playing indication was received;

— set a bookmark in a stream and use the bookmark for replaying from a different source.

FIG 3

REMOTE/INTERNAL DATABASE

| source-ID | 1$^{st}$ standard | address | 2$^{nd}$ standard | address |
|---|---|---|---|---|
| BBC | DVB | Br.C. | Internet | URL (BBC) |
| CNN | DVB | Br.C. | Internet | URL (CNN) |
| ARD | DVB | Br.C. | Internet | URL (ARD) |
| ⋮ | ⋮ | ⋮ | ⋮ | ⋮ |
| | | | | |

FIG 8B

CLIENT DEVICE, METHOD AND COMPUTER PROGRAM FOR PLAYING MEDIA CONTENT

CROSS-REFERENCE TO RELATED APPLICATIONS

This application claims priority to U.S. Patent Application No. 61/552,949 filed Oct. 28, 2011, and also claims priority to European Patent Application No. 12190037.7 filed Oct. 25, 2012.

FIELD OF THE INVENTION

The present invention relates to a playback of media content such as audio, video or other multimedia content and, particularly, to the playback of media content in the context of a distributed playback scenario.

BACKGROUND OF THE INVENTION

Distributed playback enables the synchronized presentation and interactive control of ultimedia content by multiple devices over a relatively low-band width network. The bandwidth of the network is considered to be relatively low if it is insufficient for transmitting the entire amount of uncompressed data that shall ultimately be presented at various terminals. While the network bandwidth may well be sufficient for transmitting the multimedia content in a compressed format, it may not be sufficient for transmitting the multimedia content in an uncompressed format such as data in a video interface standard as DVI.

An example use case may be found in automotive industry front and rear-seat entertainment units, where each independently functioning unit is required to simultaneously present the same media content, such as a DVD video disk inserted into a single device. For economical reasons, it is desirable to make use of an existing network infrastructure, rather than dedicated high band width equipment, cables, etc., required for the transmission of audio and video signals to and from each unit, especially when the audio and video signals are provided in a "raw" format.

In the field of infotainment and/or entertainment units, especially for the automotive industry, the distribution of video stream to the various video consumers within the vehicle has seen an increased interest from entertainment unit manufacturers and car manufacturers. Original equipment manufacturers (OEMs) started to ask for separation between the video source and the video consumer(s) due to requirements for flexibility, network transparency and standardization, while avoiding extensive and proprietary wirings.

The research and development challenges imposed on the suppliers are considerable, as the questions to be solved include those regarding a guaranteed bandwidth, low latencies, distributed A/V synchronization, block synchronization and compensation of differing travelling times, as well as a frame-synchronous presentation on several displays.

A system for implementing such a distributed playback architecture is described in PCT/EP 2011/064218, which is incorporated herein by reference.

The distributed playback, however, is not only limited to rear- or front-seat entertainment systems rigidly integrated within car seats or aircraft seats, but a distributed playback is additionally useful in a scenario, in which the rear-seat entertainment devices are mobile devices such as tablet computers which are able to connect to a distributed playback server within, for example, a car or an aircraft. Then, the distribution channel between the distributed playback server and the individual distributed playback clients will not be a local area network cable, but will be a local area network wireless channel.

Additionally, it is to be outlined that the distributed playback architecture does not necessarily have to be implemented in a car, but also can be implemented in any kind of environment (e.g. in a house or room or in-flight, i.e., in a plane or aircraft such as a passenger aircraft), where there is a distributed playback server and where there are one or several distributed playback client devices e.g. located in seats or the car, bus or aircraft, which can communicate with the distributed playback server in order to replay content and/or to exchange commands or user input information etc. A distributed playback architecture has been realized by the company Cinemo, and a Cinemo-enabled client can connect to a Cinemo-enabled server as soon as the communication channel between the client and the server is so that a useful connection between both devices is possible with respect to a certain selected or pre-negotiated communication format.

The disadvantage of this concept is that the connection between the client and the server will always depend on, for example, a wireless communication channel or a wired communication channel. In the case of a wired communication channel, a communication cable between the client device and the server device has to be plugged in, i.e., correctly installed. Irrespective of whether there is a wireless channel or a wired channel, the region of movement away from the server is limited and, on the other hand, there are typical media pieces which need a considerable time to be replayed such as movies or extended playlists. The user may wish to move away from the distributed playback server providing the media content such as the movie, and the user may additionally wish to watch, for example, the end of the movie in a different place where, for example, a connection to the distributed playback server is not possible anymore for certain reasons.

SUMMARY OF THE INVENTION

It is, therefore, an object to allow an extended media replay possibility for the user.

In an embodiment, this object is achieved by a client device for playing media content, comprising: a connection interface for establishing a connection with a server and for receiving a media content from the server via the connection; a detector for detecting, whether the media content is to be continued beyond a termination of the connection with the server, and providing a detection result in case it is determined that the media content is to be continued beyond a determination of the connection with the server; and a processor for taking an action to continue the media content beyond a termination of the connection with the server.

In a further embodiment, this object is achieved by a method of operating a client device for playing media content, the client device comprising a connection interface, a detector, and a processor, comprising: establishing, by the connection interface, a connection with a server and receiving a media content from the server via the connection; detecting, by the detector, whether the media content is to be continued beyond a termination of the connection with the server, and providing a detection result in case it is determined that the media content is to be continued beyond a determination of the connection with the server; and taking an action, by the processor, to continue the media content beyond a termination of the connection with the server.

In a further embodiment, this object is achieved by a client device for playing media content comprising a connection interface for establishing a connection with a server and for receiving a media content from the server via the connection; a user interface having a continue playing input facility; and a processor for receiving an indication whether the user has actuated the continue playing facility and for taking an action to continue the media content beyond the termination of the connection with the server.

In a further embodiment, this object is achieved by a method of operating a client device for playing media content, comprising: establishing a connection with a server and receiving a media content from the server via the connection; receiving an indication that the user has actuated a continue playing facility made available over a user input interface; and taking an action to continue the media content beyond a termination of the connection with the server.

In a further embodiment, this object is achieved by a computer program implementing any method of operating a client device as outlined above.

The present invention is based on the finding that the user comfort, the user acceptance and, particularly, the replay time can be extended even beyond the time, where the initial connection between the server and the client exists, when the client device additionally comprises a processor for receiving an indication that the user has actuated a continue playing facility on a client device user interface. Additionally, the processor then takes an action to continue the media content beyond a termination of the connection with the server.

Such action can comprise several different actions depending on the specific use case. One action is, for example, that the client downloads the content from the server and more particularly, from the time of a continue playing indication or from a time instant which is close to the time of a continue playing indication and the content is downloaded from the server until the end of the content. When, for example, a user presses a continue playing button on a user interface of the client device at a certain time, then the media content from this certain time to the end of the media content such as a movie is downloaded to the client device for later use by the user of the client device.

For reasons like DRM (Digital Rights Management), or for other reasons, the server can also submit additional rules to the client, e.g. that the client can only playback the downloaded media content once or within a certain time limitation.

Alternatively or additionally, the remaining content and a variable number of additional items such as one or more items of a predefined sequence of items such as a playlist can be downloaded in response to a continue playing indication.

Additionally, when the media content is structured as a playlist, then the remaining items of the playlist can be downloaded from the server in response to a continue playing indication.

Additionally, when the media content is an Internet stream such as YouTube, then the client device receives, from the server device, an indication of the specifically replayed Internet stream and then the client device starts a connection to this Internet stream by itself. Preferably, the client device jumps into the Internet stream at the position, where the continue playing indication was received. To this end, the client device additionally receives from the server device, on request or automatically an indication, where in the replayed stream the client device or server device was, when the continue playing indication was received by the client device or when an information on the continue playing indication sent out from the client device to the server device was received by the server device.

A further action taken by the client device in response to the continue playing indication may comprise the search for the content in the client's own database for playback and resuming playback at the position, when the continue playing indication was received by the client device. A further action may comprise the setting of a bookmark in a stream and the usage of the bookmark for replaying the stream from a different source. Further actions may be taken in order to make sure that the media content is continued by the client device beyond a termination of the connection with the server.

BRIEF DESCRIPTION OF THE DRAWINGS

Preferred embodiments of the present invention are subsequently described with respect to the accompanying drawings, in which:

FIG. 3 illustrates a selection of action to continue the content in reply to a continue playing indication;

FIG. 8b illustrates a schematic diagram of such a remote/internal database; and

DESCRIPTION OF PREFERRED EMBODIMENTS

Figure 1:
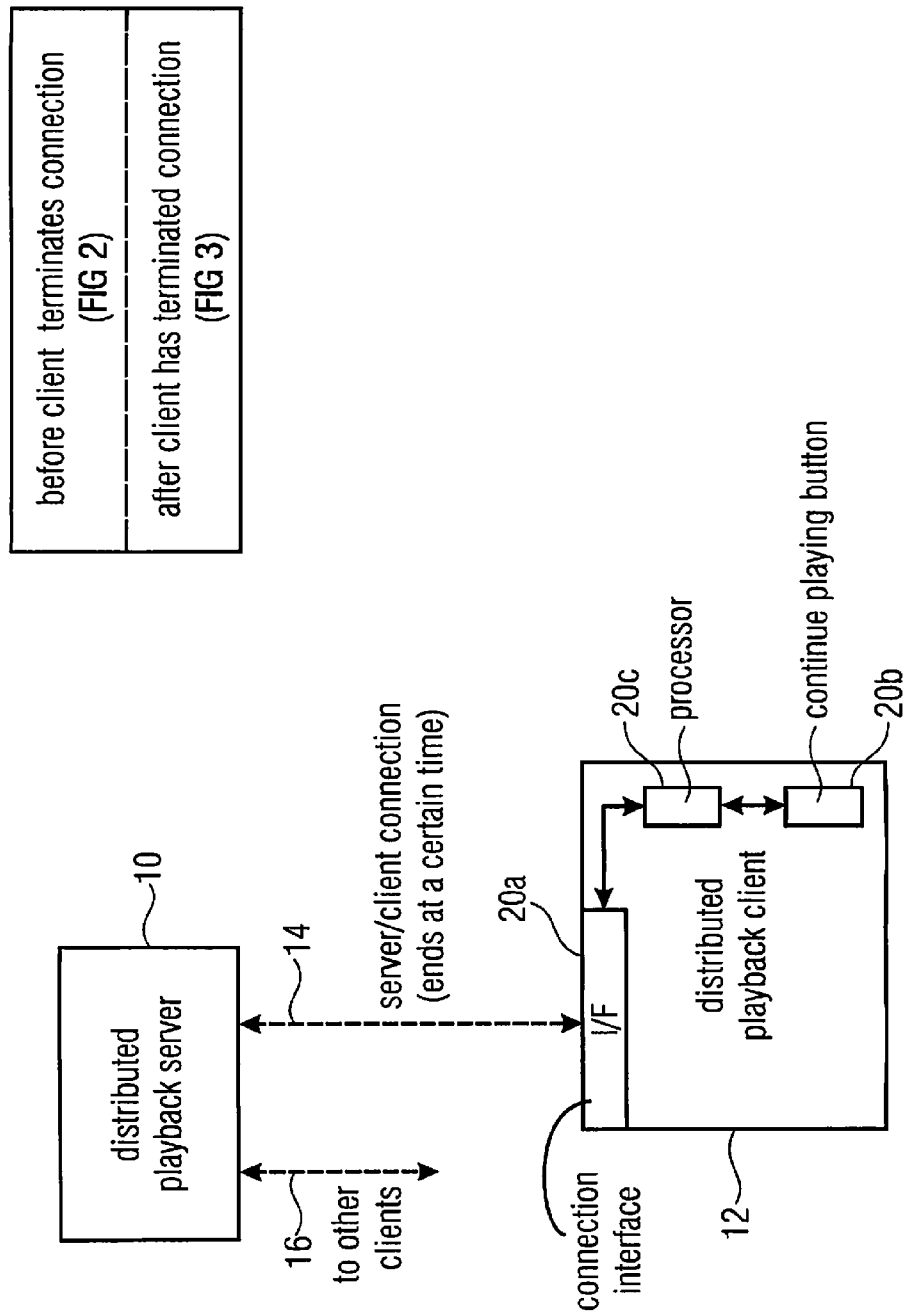
FIG. 1 is a block diagram illustrating a distributed playback scenario.

FIG. 1 illustrates a distributed playback scenario. There exist a distributed playback server 10 and several distributed playback clients, where a specific distributed playback client is indicated at 12. The distributed playback server 10 is connected to the distributed playback client via a connection 14. Other connections to other distributed playback clients which are not shown in FIG. 1 are indicated by reference numeral 16. The distributed playback client comprises a connection interface 20a for establishing a connection with the distributed playback server 10 and for receiving a media content from the server 10. Additionally, the client device comprises a user input interface having a continue playing input facility such as a continue playing button 20b. The button 20b or, alternatively, the user input interface having this continue playing facility is operatively connected to a processor 20c. The processor 20c is configured for receiving an indication that the user has actuated the continue playing functionality such as the continue playing button 20b, and for taking an action to continue the media content beyond a termination of the connection 14 with the server 10. Specifically, as indicated in the box at the upper right of FIG. 1, FIG. 2 illustrates a sequence of steps, before the connection between the client and the server is terminated and FIG. 3 illustrates a sequence of steps, after the connection between the client and the server has been terminated.

Figure 2:
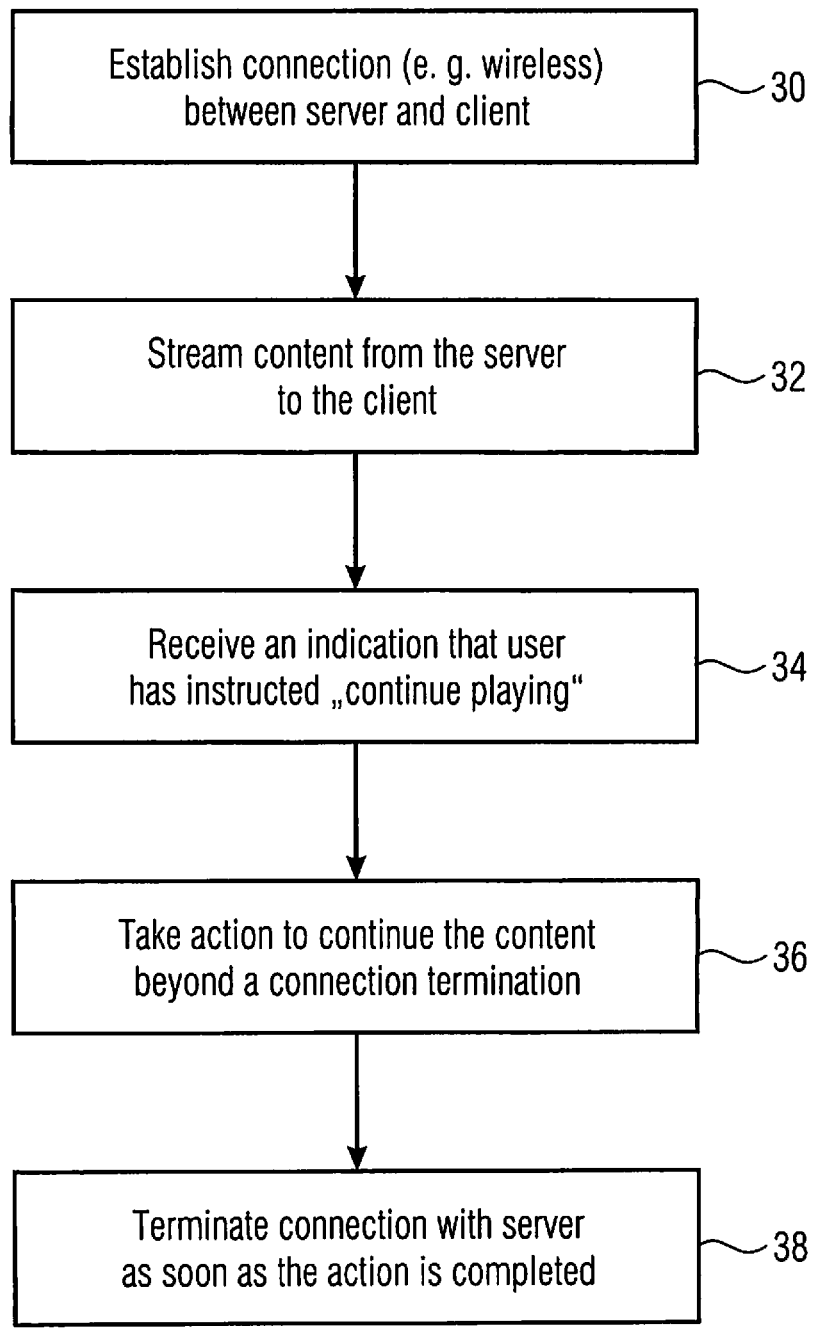
FIG. 2 is a flow chart for illustrating a sequence of steps taken by the distributed playback client before a termination of the connection with the distributed playback server.

In a step 30 in FIG. 2, a connection such as a wireless connection between the server and the client of FIG. 1 is established. Then, the server streams 32 content from the server to the client. Then, the client device receives an indication that the user of the client device has instructed continue playing as illustrated at 34 in FIG. 2. In response to the reception of the indication, the client device takes action to continue the content beyond the connection termination as indicated at 36. Then, the connection with the server is terminated as soon as the action is completed as indicated at 38. This termination of the connection can be done "automatically" as it occurs, when the user moves away to far from a server in the presence of a wireless channel. Alternatively, the client can actively terminate the connection with the server which is the preferred procedure, since the client then has full control over the connection and the client knows best, whether the action taken in step 36 is completed or not yet completed.

FIG. 3 illustrates several actions to continue the content such as downloading the content from the server, i.e., from the time of a continue playing indication until the end of the content such as the end of a movie.

Alternatively, the remaining content and the variable number of additional items such as one or more items of a predefined sequence of items are downloaded to the client's storage.

Again, alternatively or additionally, a remaining playlist can be downloaded and, particularly, the items indicated by the remaining playlist.

An alternative procedure is that a connection to an Internet stream such as YouTube is started by the client device from the position in the stream, where the continue playing indication was received. In this context, the action additionally comprises that the client device requests from the server device an identification of the Internet stream such as the URL and, additionally, an identification of the point in time, at which the playback should be resumed subsequent to a termination of the connection between the client and the server.

An alternative action may comprise the search of the content in the client's own database for playback and to resume playback at the position when the continue playing indication was received. In this context, the action additionally comprises a client's request to the server to identify the actually replayed media content so that the client knows for which media item it has to search in its own database.

A further action may be the setting of a bookmark in a media stream and the usage of the bookmark for replaying from a different source or from the same source, but with a different connection.

The client device may comprise a continue playing facility as a specific button, which can be a hard button or a soft button of a touch-sensitive display. A client downloads the remaining part of the stream from the distributed playback server. The client can then stop the connection such as by leaving, for example, a car or aircraft and the wireless connection is terminated when the client has moved far away from the car or aircraft. Then a useful wireless connection to the server in the car is not possible anymore. Due to the continue playing functionality, however, the user can continue to watch or listen to the media file.

An option is continue playing "+1", . . . "+2", etc. and "finish playing playlist". This feature would then download also some or all additional files. Optionally, the user does not have different buttons, but the continue playing functionality is pre-configured to one of the above options.

Optionally, as soon as the user plays something else not from the downloaded playlist anymore, this "copied" playlist will disappear, i.e., will be deleted. This may be particularly useful due to copyright owner issues that otherwise may come up.

If the content comes from, for example, an Internet stream such as YouTube, and the client disconnects from the server, the client will itself try to open an Internet connection to the same clip. Another option would be that as soon as the client will lose the connection, there will appear a button "continue playing" and then the client will try to continue to play the Internet stream or, if it was a file playback before, tries to find the same file in its own media management database and then will continue to play.

A further option is that this button will only appear, if the same file has been found, or in case of an Internet connection, if the client is online itself.

Another option would be that the client will automatically always continue to play and optionally informs the user that is has been detached. Optionally, there is a database online, which could help the user to find the right connection. When the user is, for example, watching a DVB stream channel such as BBC, and now the user is disconnected, the database can find a web-stream also having the same channel, i.e., the BBC channel.

In implementations, continue playing can either be proactive or reactive. In the first case, the user indicates in advance that he wishes to continue playback at some future time or location. In the second case, an optional feature is that no warning is given, but that the processor was restarted after being switched off or lost connection or some other interruption. The played content can be local content or content from a locally connected device. Additionally, the content can be Internet content which is not registered with any specific media server but which is generally available such as from YouTube and which is just a plain URL. The content can additionally be remote content over HTTP from a specific distributed media server running on another machine.

The continue playing can be optionally done in several ways. A bookmark can be stored with some kind of file identifier and this requires that the content still exists somewhere, when the user wishes to continue the playback. The identifier must be valid across multiple instances of a distributed media server if that is where the content is located. The bookmark can be stored both proactively or reactively. A further option is that the entire content is downloaded in advance which can be done proactively.

For replaying local content, a bookmark can be sufficient.

For replaying Internet content, a bookmark or a download can be chosen, depending on if the location, one wishes to continue playing will have an Internet connection.

In case of remote content from a distributed media server, either a bookmark or a download can be chosen, depending on if the location one wishes to continue playing will have a dedicated distributed playback server running with the same content.

In certain situations, the user will know if the location he wishes to continue playing will have physical access to the same content. In this case the user should probably choose himself an option with local content or an option with Internet content. In this case, the continue playing feature requires two button functionalities such as one button for "bookmark" and a further button for "download". Depending on a playback configuration, additional features related to this functionality can be greyed out, i.e., when a download of a local content, for example, is not possible.

A further option is that, if the distributed playback functionality is shutdown or a connection is lost, then a bookmark is saved when possible. This will enable the continue playing feature to work reactively, when the distributed playback functionality is re-started and the content is still available.

Figure 4:
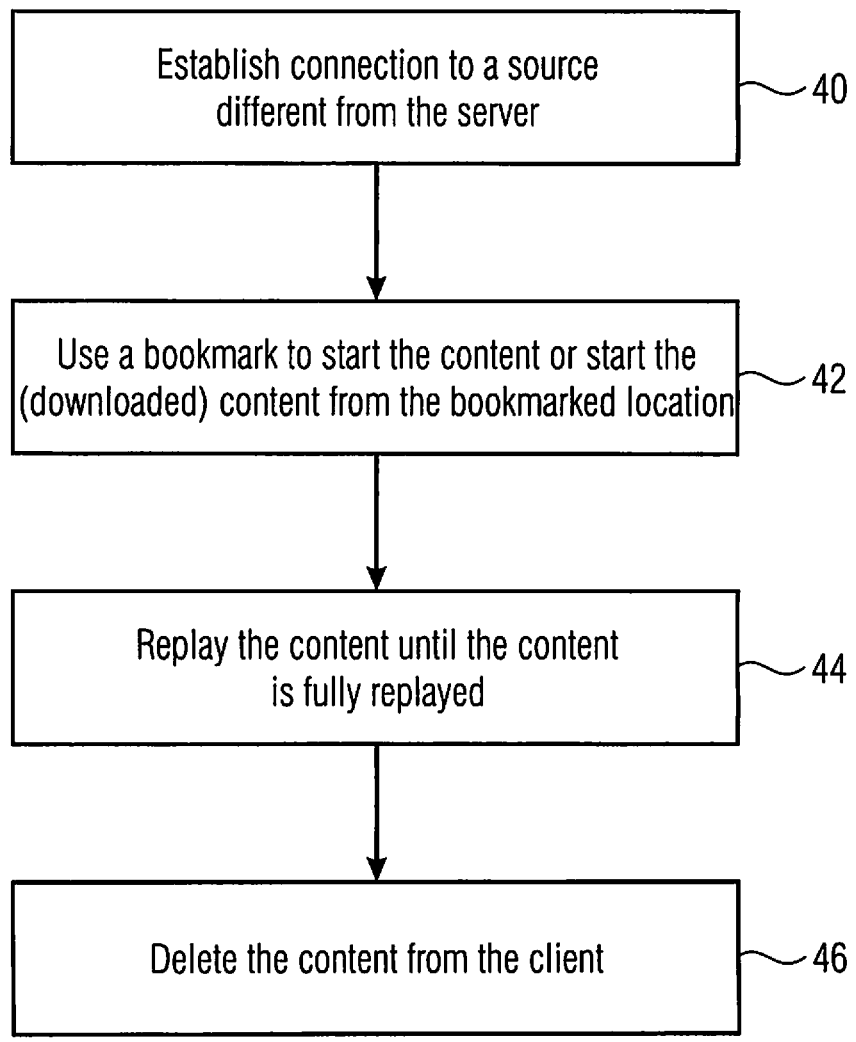
FIG. 4 is a flow chart of steps taken by the client device after the connection between the client and the server has been terminated.

FIG. 4 illustrates a sequence of steps of a preferred embodiment, which occurs, after the client has terminated the connection.

In a step 40, the client device establishes a connection to a source different from the distributed playback server 10. This source can be the Internet or can be a storage device in the distributed playback client such as a hard disk drive or a semiconductor storage. Alternatively, the source different from the original server can be a further distributed playback server available in the location where the user has moved subsequent to terminating the connection in step 38.

In step 42, the user uses a bookmark to start the content or start the "downloaded" content from the bookmark location in the media file. Then, in step 44, the content is replayed until the content is fully replayed or, for example, the movie is finished or the playlist is fully played. Then, in step 46, the content can be deleted from the client, when content has been downloaded to the client. When data associated to contents are just playlists, the playlists are deleted in order to address some kind of copyright or other issues related to actually downloading content contrary to only streaming but not locally saving content.

Figure 5:
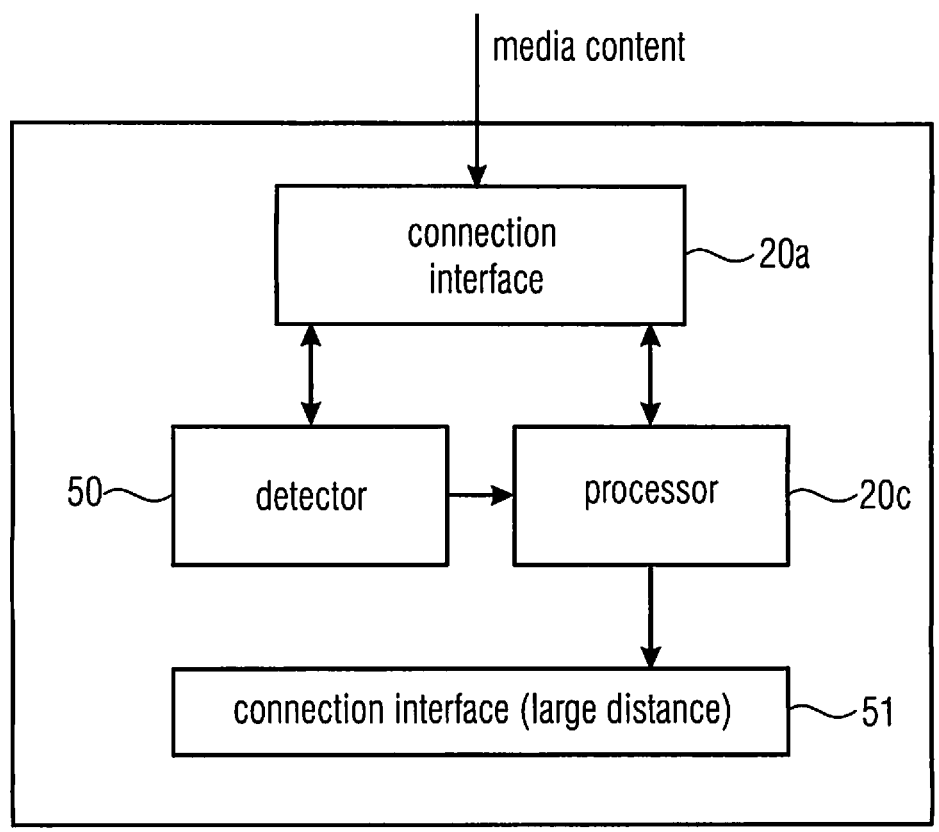
FIG. 5 illustrates a further embodiment of the client device in accordance with the present invention.

FIG. 5 illustrates a further embodiment of the client device comprising the connection interface 20a for establishing a connection with a server (not shown) and for receiving a media content from the server via the connection. Furthermore, FIG. 5 illustrates a processor for taking an action to continue the media content beyond a termination of the connection with the server indicated with 20c similar to FIG. 1.

Additionally, the client device in FIG. 5 comprises a detector 50 for detecting, whether the media content is to be continued beyond a termination of the connection with the server, where the detector is furthermore configured to provide a detection result to the processor 20c, when it is detected by the detector that the media content is to be continued beyond the termination of the connection with the server.

As illustrated in FIG. 1, the detector 50 may comprise a user interface schematically illustrated in FIG. 1 as the continue playing button 20b. Therefore, in other words, the detector 50 may comprise a user input interface having a continue playing input facility such as the continue playing button.

Furthermore, the detector 50 is configured to provide the detection result, when the user has activated the continuing playing input facility.

Figure 7:
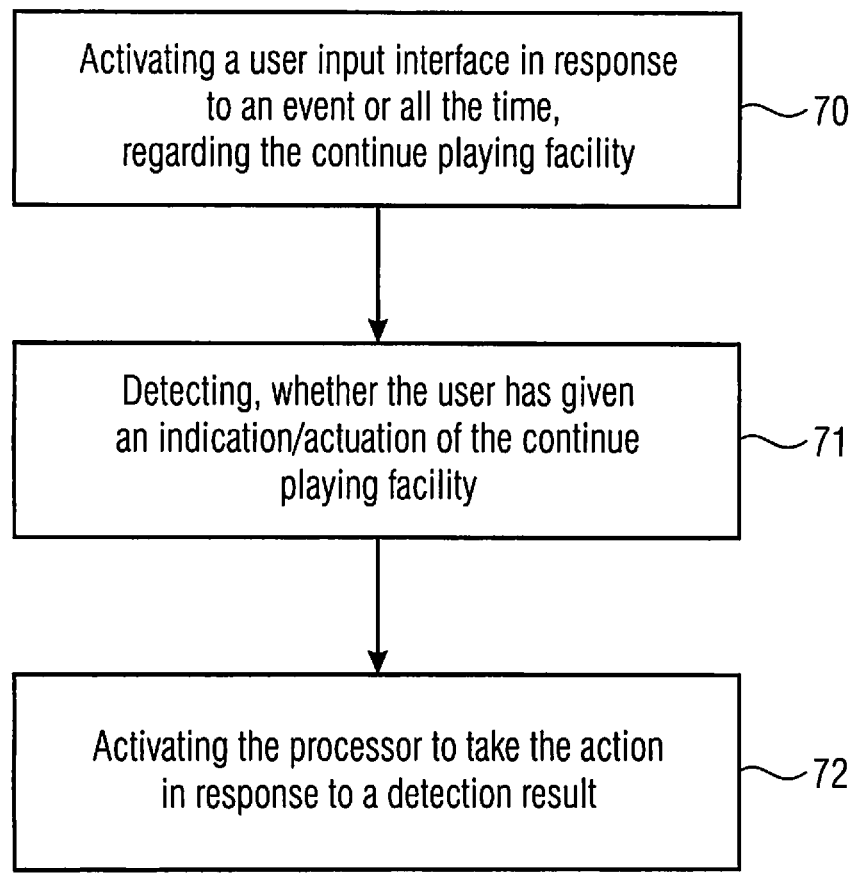
FIG. 7 illustrates a functionality of the detector of FIG. 5 in accordance with a further embodiment.

As illustrated in FIG. 7, this functionality is so that the detector 50 activates a user input interface in response to a certain event or all the time, where this user input interface is related to a continue playing facility or, in other words, comprises a display or any other input facility for receiving a continue playing input from the user.

Then, in step 71, it is detected by the detector 50, whether the user has actuated the continue playing facility. In other words, the detector detects, whether there is an indication that the user has actually actuated the continue playing input facility.

Then, in step 72, the detector activates the processor 20c to take the action in response to a detection result. In other words, the detector outputs the detection result and the processor 20c receives the detection result and starts the action to continue the media content beyond a termination of the connection with the server in response to a reception of the detection result.

Figure 6:
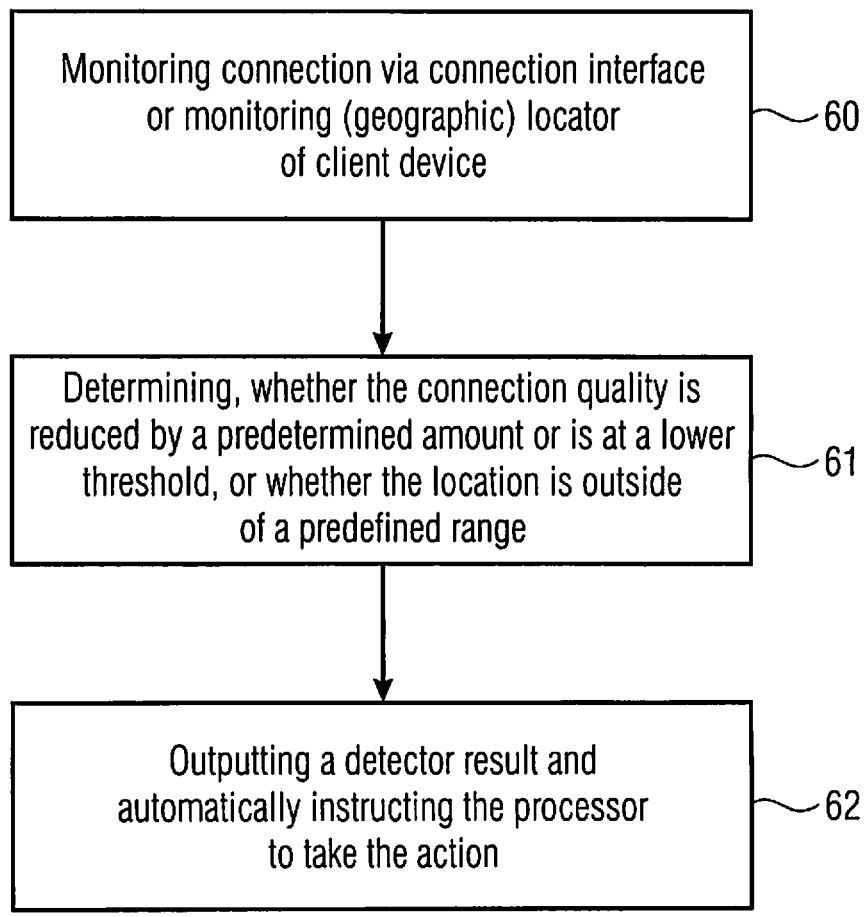
FIG. 6 illustrates a flow chart for explaining a functionality of the detector of FIG. 5 in accordance with one embodiment.

In an alternative embodiment of the present invention, the detector provides the detection result by detecting different events. In a step 60 illustrated in FIG. 6, the detector monitors the connection via the connection interface 20a or, alternatively or additionally monitors a location of the client device. This location of the client device can be a geographic location of the client device, but can also be any other kind of location of the client device such as a certain distance around a server e.g. in a car or aircraft.

In step 61, the detector determines, whether the connection quality via the connection interface is reduced by a predetermined amount or is at a lower threshold. Therefore, the detector determines, by monitoring the connection quality such as by monitoring RSSI values or any other, for example wireless signal connection parameters, whether it can be expected that the connection quality is soon terminated. This is a strong indication that the client device is moved farther and farther away from the server.

This monitoring can be performed either by monitoring, whether the quality becomes worse by a predetermined amount such as 3 or 6 dB or this can be alternatively determined by monitoring, whether the connection quality exemplarily represented by a certain (absolute) RSSI value approaches a lower threshold such as a lower threshold RSSI value, which is determined, for example empirically.

This connection threshold is set in such a way that it can be assumed, when normal movement speeds away from the server are considered, that the connection quality to the server will remain for some remaining time so that the client device has a good chance to successfully retrieve the rest of the media content from the server. However, when the threshold is more close to the absolute connection threshold quality, then the client device does not have the chance anymore to download the rest of the media content from the server via the connection, but the client device then has to look for other alternatives to obtain the content as, for example, exemplarily illustrated in FIG. 3.

Then, in step 62, the detector outputs its detection result and, automatically, the processor is instructed to take the action without any user activity. In this embodiment, it is additionally preferred that the processor then takes the action to obtain the rest of the media content and, as soon as the processor has received the rest of the media content or has established a different source or a connection to the same source via a different connection standard, the processor then activates a continue playing button on the display of the client device or outputs a certain acoustical signal by the client device so that the user knows that everything is ready for continue playing, although the connection to the initial server is terminated. Therefore, the user can only see and activate the continue playing facility, when the media content is available. Additionally, in a further embodiment, the processor can notify the user via a certain output interface such as a display interface that the connection to the initial server is detached. This user information can be performed either when a successful continue playing alternative has been found or irrespective of whether this alternative has been found, in any case, when the connection to the server is broken or detached.

Figure 8A:
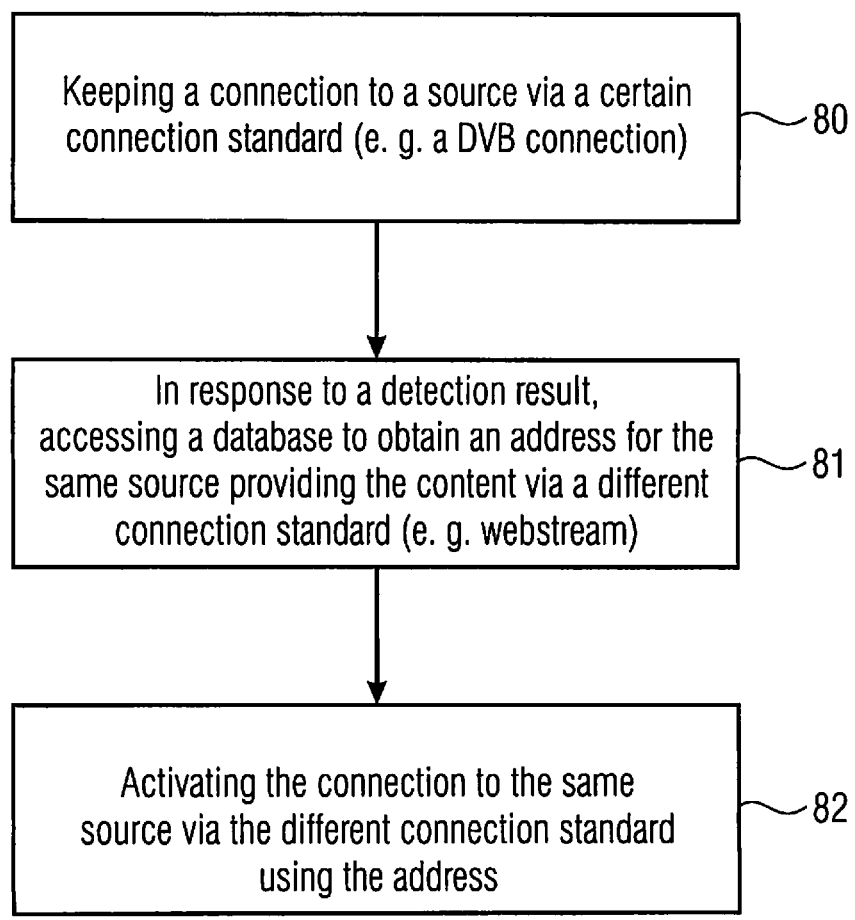
FIG. 8a illustrates a functionality of the client device in which a remote or internal database is used.

FIG. 8a illustrates a further functionality of the client device. In step 80, the connection interface 20a is configured to keeping a connection to a source via a certain connection standard which can, for example, be a DVB (Digital Video Broadcasting) connection or any other broadcast or other connection. The processor is configured, as illustrated in step 81, to access a database, in response to a detection result from the detector 50. This database can be an internal or external/remote database and this database is in a certain embodiment, illustrated in FIG. 8b. The processor 20c is configured to access this database to obtain an address for the same source providing the content via a different standard. This different connection standard can, for example, be a webstream or Internet standard such as a packet-based streaming or any other packet-based transmission standard.

In step 82, the processor is then configured to activate the connection to the same source via the different connection standard using the address retrieved from the database.

The database illustrated in FIG. 8b illustrates, in an association to each other, source IDs for media content sources such a television channels indicates as "BBC, CNN, ARD". However, any other source-IDs for any other broadcast content such as radio programs or any other sources can be provided. Since the television channels transmit via the DVB standard, the first standard indication is "DVB". For broadcast audio channels, the standard can be DAB.

Then, in the address column for the first standard, an indication that this is a broadcast channel is indicated, which means that this is a broadcast connection rather than a point-to-point connection.

Then, in the second standard column, it is outlined for the three television channels that the second standard is an Internet standard and in the address column for the second standard, the URL (Uniform Resource Locator) for the television programs are indicated. Typically, all television programs or audio programs also provide a webstream and the URL of the server providing this webstream can then be used by the processor 20c for activated a connection as illustrated in step 82.

Figure 9:
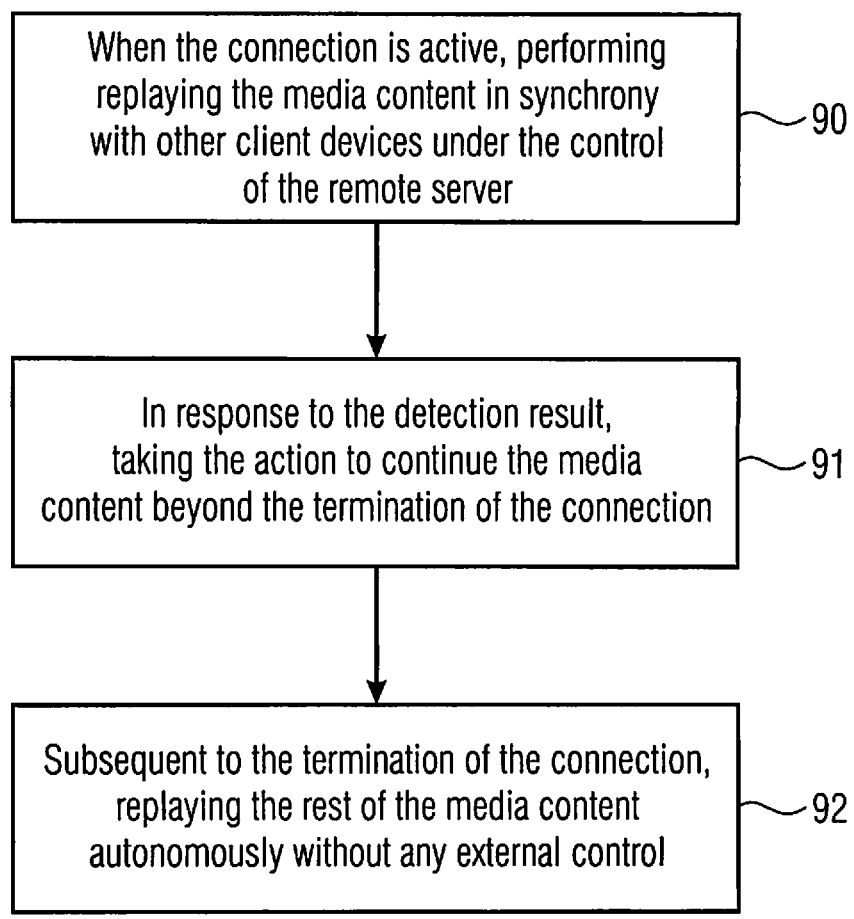
FIG. 9 illustrates a further functionality of the client device in accordance with a further embodiment of the present invention.

FIG. 9 illustrates a further functionality of a client device in accordance with another embodiment. As illustrated in FIG. 9, the processor 20c is configured for performing replaying a media content, when the connection to the server is still active, where this replaying is performed in synchrony with at least one other client device under the control of the remote server. Hence, the processor is configured for performing, for example, the Cinemo distributed playback architecture/functionality for replaying the media content, when the straightforward normal connection to the Cinemo server is active.

However, when the user is, for example, leaving the car or aircraft, then the processor 20c is configured to take the action to continue the media content beyond termination of the connection in response to a detection result/a user input as indicated by 91. Then, subsequent to the termination of the connection, and provided that the processor was successful in obtaining the media content rest or providing another source for the rest of the media content, step 92 is performed. In step 92, however, the client device is configured for replaying the rest of the media content autonomously without any external control and, therefore, also without any synchrony with at least one other client device. Therefore, the client device is configured for performing two different replaying facilities, wherein the first replaying facility is a synchronous replaying facility under the control of the remote server as illustrated in 90 and the second replaying facility is an autonomous straightforward replaying facility without any control of an external server with respect to a synchronization with other client devices.

The client device illustrated in FIG. 5 may further comprise a second connection interface 51 which is a large distance wireless communication interface configured for establishing connection to the Internet, for example, via a cellular telephone network. On the other hand, however, the connection interface 20a may then be implemented as a small distance wireless connection interface such as a Bluetooth or WLAN connection interface.

Furthermore, the processor 20c may be configured to activate, as the action to continue the media content, the large distance wireless connection interface 51 in response to the detection result or the indication that the user intends to have a continue playing functionality and to connect to a remote server associated with a URL and to download a remaining portion of a media content or to stream a remaining portion of the media content using a position information determined together with the URL. Particularly, the processor 20c is configured to determine, in response to the detection result, a URL, from which the media content can be received and the position information indicating a position in the media content before or at which the connection to the server was terminated.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a BD, DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. Client device for playing media content, comprising:
a connection interface configured for establishing a connection with a server and for receiving a media content from the server via the connection;
a detector configured for detecting, whether the media content is to be continued beyond a termination of the connection with the server, and configured for providing a detection result in case it is determined that the media content is to be continued beyond the termination of the connection with the server; and
a processor configured for taking an action to continue the media content by the client device beyond the termination of the connection with the server, wherein the detector is configured to determine a quality of the connection to the server, and to provide a detection result in response to a quality decrease by a predefined amount or in response to a quality decrease until a quality threshold, or to detect a movement of the device and to provide the detection result in response to a movement of the client device beyond a predefined movement area.

2. Client device of claim 1, wherein the detector comprises a user interface having a continue playing input facility; and
wherein the detector is configured to provide the detection result, when the user has activated the continue playing input facility.

3. Client device of claim 1, wherein the processor is configured to take the action in response to the detection result without a user input, and
to notify the user by an output signal that the connection is terminated, and that the action has been taken, the output signal comprising an optical display signal, a vibration signal or an acoustic signal.

4. Client device of claim 1, wherein the media stream is originating from a source and a connection to the source is in accordance with a first connection standard,
wherein the processor is configured to connect to a database comprising different source identifications and associated addresses of the same source providing the media content via a different connection standard, to access the database to retrieve the address of the same source providing the media content via the different communication standard, and to connect to the source having the address using the different communication standard.

5. Client device of claim 4, wherein the first connection standard is a digital video broadcasting connection standard to obtain a certain broadcast program, and wherein the second connection standard is an Internet protocol connection standard to obtain the same broadcast program via the Internet.

6. Client device in accordance with claim 1, in which the connection interface is configured as a small distance wireless connection interface;
wherein the client device furthermore comprises a large distance wireless connection interface configured for establishing a connection to the Internet,
wherein the processor is configured, to activate, as the action, the large distance wireless connection interface in response to an indication that the user has actuated a continue playing facility, and to connect to a server associated with a uniform resource locator (URL) and to download a remaining portion of the media content or to stream a remaining portion of the media content using a position information,
wherein the processor is furthermore configured to determine the uniform resource locator, from which the media content can be received, and to determine the position information indicating a position in the media content before or at which the connection to the server was terminated.

7. Client device in accordance with claim 1, wherein the processor is furthermore configured to establish a connection with the server via the connection interface, to receive a streamed content from the server, to render the streamed content via an output interface comprising audio or video replay facilities, to activate a continue playing button on the client device as soon as the processor has detected a quality decrease of the connection with the server by a predefined amount, and to connect to a different source for the media content in response to a user indication that the user has activated the continue playing button.

8. Client device in accordance with claim 1, in which the processor is configured to perform at least one action of the following set of actions to continue the media content, the set of actions comprising:
determining a position in the media content at or before the detection result is provided, and downloading the media content from the server and storing the downloaded content on the client device starting from the position in the media content indicated by the position information;
determining a position in the media content at or before the detection result is provided, wherein the media content is a predefined playlist comprising a sequence of media items, downloading a remaining portion of a current media item or additionally one or more additional items in the sequence of media contents either in response to a predefined setting or in response to an user input regarding a number of additional items;
determining a position in the media content at or before the detection result is provided, starting a connection to an Internet server by the client device from the position in the stream;
determining a position in the media content at or before the detection result is provided, searching a media database stored in a local storage of the client device, and resuming playback at the position from the media database stored in the local storage of the client device; and
setting a bookmark at a position in the media content at or before the detection result is provided, connecting to a different remote source of the media content, and receiving from the different remote source a media content using the bookmark.

9. Client device of claim 1, in which the processor is configured for replaying the media content until an end of the media content and for deleting the content on the client device, when the end of the media content is fully replayed without any user interaction.

10. Client device of claim 1, wherein the processor is configured to store a bookmark at a termination of the connection or when the processor has received an indication that the user has actuated a continue playing input facility, and
wherein the processor is configured to resume playing back the media content at the bookmark, when a connection to the same server is established at a later time.

11. Client device in accordance with claim 1, wherein the server is a distributed playback server, wherein the processor is configured to replay the media content in synchrony with at least one other client device under a control of the distributed playback server, and
wherein the processor is configured to replay the media content subsequent to taking the action in an autonomous way without being synchronized with the at least one other client device.

12. Client device of claim 1, wherein the processor is configured to take the action under control of the detector without any user interaction,
wherein the processor is configured to display or activate a continue playing button on the client device, when the processor has established a connection to a different source of the media content and is in the position to replay the media content beyond the termination of the connection, and
wherein the processor is configured to not display or not activate the continue playing button, when the processor, although having taken the action is not in the position to replay the media content beyond the termination of the connection.

13. Method of operating a client device for playing media content, the client device comprising a connection interface, a detector, and a processor, comprising:
establishing, by the connection interface, a connection with a server and receiving a media content from the server via the connection;
detecting, by the detector, whether the media content is to be continued beyond a termination of the connection with the server, and providing a detection result in case it is determined that the media content is to be continued beyond the termination of the connection with the server; and
taking an action, by the processor, to continue the media content by the client device beyond the termination of the connection with the server, wherein the detecting comprises determining a quality of the connection to the server, and providing a detection result in response to a quality decrease by a predefined amount or in response to a quality decrease until a quality threshold, or detecting a movement of the device and providing the detection result in response to a movement of the client device beyond a predefined movement area.

14. A non-transitory storage medium having stored thereon a computer program comprising a program code for performing a method of operating a client device in accordance with claim 13.

* * * * *